(12) United States Patent
Schwendenmann et al.

(10) Patent No.: US 11,506,079 B2
(45) Date of Patent: Nov. 22, 2022

(54) FLUID DIFFUSION DEVICE FOR SEALED BEARING COMPARTMENT DRAINBACK SYSTEM

(71) Applicant: United Technologies Corporation, Farmington, CT (US)

(72) Inventors: Andrew V. Schwendenmann, Hampden, MA (US); Francis Parnin, Suffield, CT (US); Matthew Gomes, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 510 days.

(21) Appl. No.: 16/572,806

(22) Filed: Sep. 17, 2019

(65) Prior Publication Data

US 2021/0071677 A1    Mar. 11, 2021

Related U.S. Application Data

(60) Provisional application No. 62/897,507, filed on Sep. 9, 2019.

(51) Int. Cl.
*F01M 11/00*   (2006.01)
*F02C 7/06*    (2006.01)
*F04D 29/06*   (2006.01)
*F16C 33/10*   (2006.01)
(Continued)

(52) U.S. Cl.
CPC ......... *F01D 25/18* (2013.01); *F01M 11/0004* (2013.01); *F02C 7/06* (2013.01); *F04D 29/06* (2013.01); *F16C 33/1045* (2013.01); *F16N 21/00* (2013.01); *F01M 2011/0033* (2013.01);

*F05D 2220/32* (2013.01); *F05D 2230/80* (2013.01); *F05D 2260/6022* (2013.01);
(Continued)

(58) Field of Classification Search
CPC . F01D 25/18; F02C 7/06; F04D 29/06; F01M 11/0004; F01M 2011/0033; F16N 21/00; F16N 2210/02; F05D 2260/98; F05D 2260/6022; F05D 2260/609
See application file for complete search history.

(56) References Cited

U.S. PATENT DOCUMENTS 4,862,995 A * 9/1989 Faria ..................... F01M 11/00
                                                          417/310
5,261,751 A    11/1993 Heinz
5,813,493 A     9/1998 Sloan et al.
(Continued)

FOREIGN PATENT DOCUMENTS

CN       201241753 Y    5/2009
CN       203463452 U    3/2014
(Continued)

OTHER PUBLICATIONS

EP Search Report dated Mar. 3, 2021 issued for corresponding European Patent Application No. 20202903.9.
(Continued)

*Primary Examiner* — Topaz L. Elliott
(74) *Attorney, Agent, or Firm* — Bachman & LaPointe, P.C.

(57) ABSTRACT

A diffuser for an oil drainback system drain tube includes a flow chamber configured for attachment to an open end of a drain tube, wherein the flow chamber has a side wall and an end wall, and openings in at least the side wall.

15 Claims, 7 Drawing Sheets

(51) Int. Cl.
*F16N 21/00* (2006.01)
*F01D 25/18* (2006.01)

(52) U.S. Cl.
CPC ...... *F05D 2260/98* (2013.01); *F16C 2360/23* (2013.01); *F16N 2210/02* (2013.01)

(56) References Cited

U.S. PATENT DOCUMENTS

| | | | |
|---|---|---|---|
| 6,199,543 | B1 | 3/2001 | Bedkowski |
| 7,017,546 | B1 | 3/2006 | Patel et al. |
| 3,500,869 | A1 | 8/2013 | Johnson et al. |
| 8,621,839 | B2 * | 1/2014 | Alecu ................. F02C 7/06 60/39.08 |
| 9,341,117 | B2 | 5/2016 | Remer et al. |
| 9,650,957 | B2 | 5/2017 | Cutrara et al. |
| 10,100,735 | B2 | 10/2018 | Craig |
| 10,287,915 | B2 | 5/2019 | McCune |
| 2008/0078617 | A1 * | 4/2008 | Glahn ................. F01D 25/186 184/6 |
| 2008/0190091 | A1 | 8/2008 | Peters et al. |
| 2008/0245614 | A1 | 10/2008 | Matucheski |
| 2010/0058729 | A1 | 3/2010 | Fomison et al. |
| 2012/0060508 | A1 * | 3/2012 | Alecu ................. F01D 25/20 60/39.08 |
| 2012/0324899 | A1 | 12/2012 | Dibenedei et al. |
| 2015/0176492 | A1 | 6/2015 | Cutrara et al. |
| 2016/0017812 | A1 * | 1/2016 | Sheridan ............. F16N 39/002 415/1 |
| 2016/0356179 | A1 * | 12/2016 | Tennevall ........... F01D 25/183 |
| 2019/0323382 | A1 * | 10/2019 | Pankratov ........... F01D 25/183 |
| 2021/0123361 | A1 | 4/2021 | Davis et al. |
| 2021/0123385 | A1 * | 4/2021 | Schwendenmann .... F01D 25/18 |

FOREIGN PATENT DOCUMENTS

| | | | |
|---|---|---|---|
| CN | 203730508 U | 7/2014 | |
| CN | 207750348 U | 8/2018 | |
| FR | 2000665 A1 | 9/1969 | |
| FR | 3037614 A1 | 12/2016 | |
| JP | 2001140654 A | 5/2001 | |
| WO | WO-2018113332 A1 * | 6/2018 | ............ B01D 45/14 |
| WO | 2019147778 A1 | 8/2019 | |

OTHER PUBLICATIONS

EP Search Report dated Mar. 5, 2021 issued for corresponding European Patent Application No. 20203444.3.
European search report for patent application No. 20 19 4406 dated Jan. 26, 2021.

* cited by examiner

FLUID DIFFUSION DEVICE FOR SEALED BEARING COMPARTMENT DRAINBACK SYSTEM

CROSS-REFERENCE TO RELATED APPLICATION

This application claims the benefit of provisional application Ser. No. 62/897,507, filed Sep. 9, 2019.

BACKGROUND OF THE DISCLOSURE

The present disclosure relates to an oil drainback system of a sealed bearing compartment and, more particularly, to a fluid diffusion device for such an oil drainback system.

Gas turbine engines have bearing compartments wherein the bearings for rotating components within the engine are housed. These bearing compartments require oil and typically include dynamic seals with an air buffered cavity to contain oil within the compartment. A passive drainback system is sometimes desired to ensure oil cannot enter the buffered air cavity and eventually make its way into the flow path of a gas turbine engine. A gutter system is sometimes located directly outboard of the bearing compartment seals, and is attached to a drain tube which passes the captured oil from the gutter system back into the bearing compartment and thereby prevents the oil from reaching the flow path of the engine. One non-limiting example of such a gutter system is that disclosed in U.S. Pat. No. 10,287,915.

Typically, bearing compartments operate at a different pressure relative to the surrounding buffer air cavity to maintain the oil containment function of the seals. Because of the need to maintain this pressure differential there is a limited ability for the bearing compartment to process additional air flow from other sources such as a drain feature.

It is usually desired to locate the end of the drain tube, which returns oil to the bearing compartment, as low into the compartment strut (and therefore as close to the drain port or sump) as possible. This is due to the desire to keep the tube in a relatively calm part of the strut to avoid potential for back flow, to increase the overall head height in the tube (again to help prevent back flow), and finally to reduce the impact that any debris from the buffer cavity will have on components within the bearing compartment.

During positive differential pressures, where pressure in the buffer cavity is higher than pressure in the bearing compartment, managing additional airflow into the bearing compartment through the drain tube, both in terms of overall mass flow and velocity, can become a significant factor in proper functioning of the oil drainback system.

Modern gas turbine engine bearing compartments are highly optimized designs to accommodate high oil flows in a relatively small amount of space. Many factors impact the ability of the sump to effectively scavenge oil, but typically they are heavily influenced by the operating pressures inside and outside of the compartment. Additionally, the quality of the oil entering the drain tube can affect the ability of the scavenge pump to scavenge oil. Further, high air content entrained within the oil can significantly impact the drain efficiency of the sump.

Introducing a drain tube into a sealed bearing compartment that is under a positive delta pressure results in significant amounts of airflow through the drain tube and into the sump or at least the area of the sump. This additional airflow can impact the scavenge capability of the sump (even with a breathed compartment), especially in small, high speed, bearing compartments.

One response to this problem has been to introduce a restriction device (for example an orifice) into the drain tube to reduce the mass flow of the air entering the compartment and thereby reduce velocity of the air. This is an effective way of reducing the impact that the airflow has on scavenge capability, but significantly reduces the ability of the drainback system to tolerate debris that may likely be in the system. The size of the orifice needed to create acceptable air flow conditions is sufficiently small that the orifice may become blocked by debris.

The present disclosure addresses this problem.

SUMMARY OF THE INVENTION

In one non-limiting configuration, a diffuser for an oil drainback system drain tube comprises a flow chamber configured for attachment to an open end of a drain tube, wherein the flow chamber has a side wall and an end wall, and openings in at least the side wall.

In one non-limiting embodiment, the flow chamber further comprises at least one end opening in the end wall. In another non-limiting embodiment, flow area of the openings in the side wall is greater than flow area of the end opening.

In a further non-limiting embodiment, the diffuser has at least one baffle in the flow chamber between an inlet end where the flow chamber connects to the drain tube, and the end opening.

In still another non-limiting embodiment, openings in the side wall are distributed upstream and downstream of the baffle.

In a still further non-limiting embodiment, openings upstream of the baffle have a smaller diameter than openings downstream of the baffle.

In another non-limiting embodiment, the side wall defines a cylinder, and the openings are distributed around a circumference of the cylinder.

In a further non-limiting embodiment, the openings are also distributed along a length of the cylinder.

In another configuration, an oil drainback system for a bearing compartment of a gas turbine engine, comprises a bearing compartment; a buffer air area around the bearing compartment; a sump for scavenging oil from the bearing compartment; a gutter system for collecting oil from the buffer air area; an oil flow path connected to the gutter system and exposed to pressure within the buffer air area; a drain tube connected to the oil flow path and extending into the bearing compartment to return oil collected from the buffer air area back into the bearing compartment; and means for diffusing gas flow from the drain tube within the bearing compartment.

In one non-limiting embodiment, the means for diffusing comprises a flow chamber attached to an open end of the drain tube, wherein the flow chamber has a side wall and an end wall, and openings in at least the side wall.

In another non-limiting embodiment, the flow chamber further comprises at least one end opening in the end wall.

In a further non-limiting embodiment, a flow area of the openings in the side wall is greater than the flow area of the end opening.

In still another non-limiting embodiment, the diffuser further comprises at least one baffle in the flow chamber between an inlet end where the flow chamber connects to the drain tube, and the end opening.

In a still further non-limiting embodiment, openings in the side wall are distributed upstream and downstream of the baffle.

In another non-limiting embodiment, openings upstream of the baffle have a smaller diameter than openings downstream of the baffle.

In a further non-limiting embodiment, the side wall defines a cylinder, and the openings are distributed around a circumference of the cylinder.

In still another non-limiting embodiment, the openings are also distributed along a length of the cylinder.

In another configuration, a method is disclosed for upgrading an oil drainback system for a gas turbine engine, wherein the oil drainback system comprises a bearing compartment; a buffer air area around the bearing compartment; a sump for scavenging oil from the bearing compartment; a gutter system for collecting oil from the buffer air area; an oil flow path connected to the buffer air area and exposed to pressure within the buffer air area; and a drain tube connected to the oil flow path and extending into the bearing compartment to return oil collected from the buffer air area back into the bearing compartment, wherein the method comprises mounting a diffuser to an open end of the drain tube, wherein the diffuser comprises a flow chamber configured for attachment to the open end of the drain tube, the flow chamber having a side wall and an end wall, and openings in at least the side wall.

In another non-limiting embodiment, the drain tube contains an orifice for restricting flow through the drain tube, and wherein the method further comprises removing the orifice from the drain tube in advance of the mounting step.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

The invention relates to fluid diffusion device for an oil recirculation or drainback system and, more particularly, to such a device for an oil drainback system in a gas turbine engine.

Figure 1:
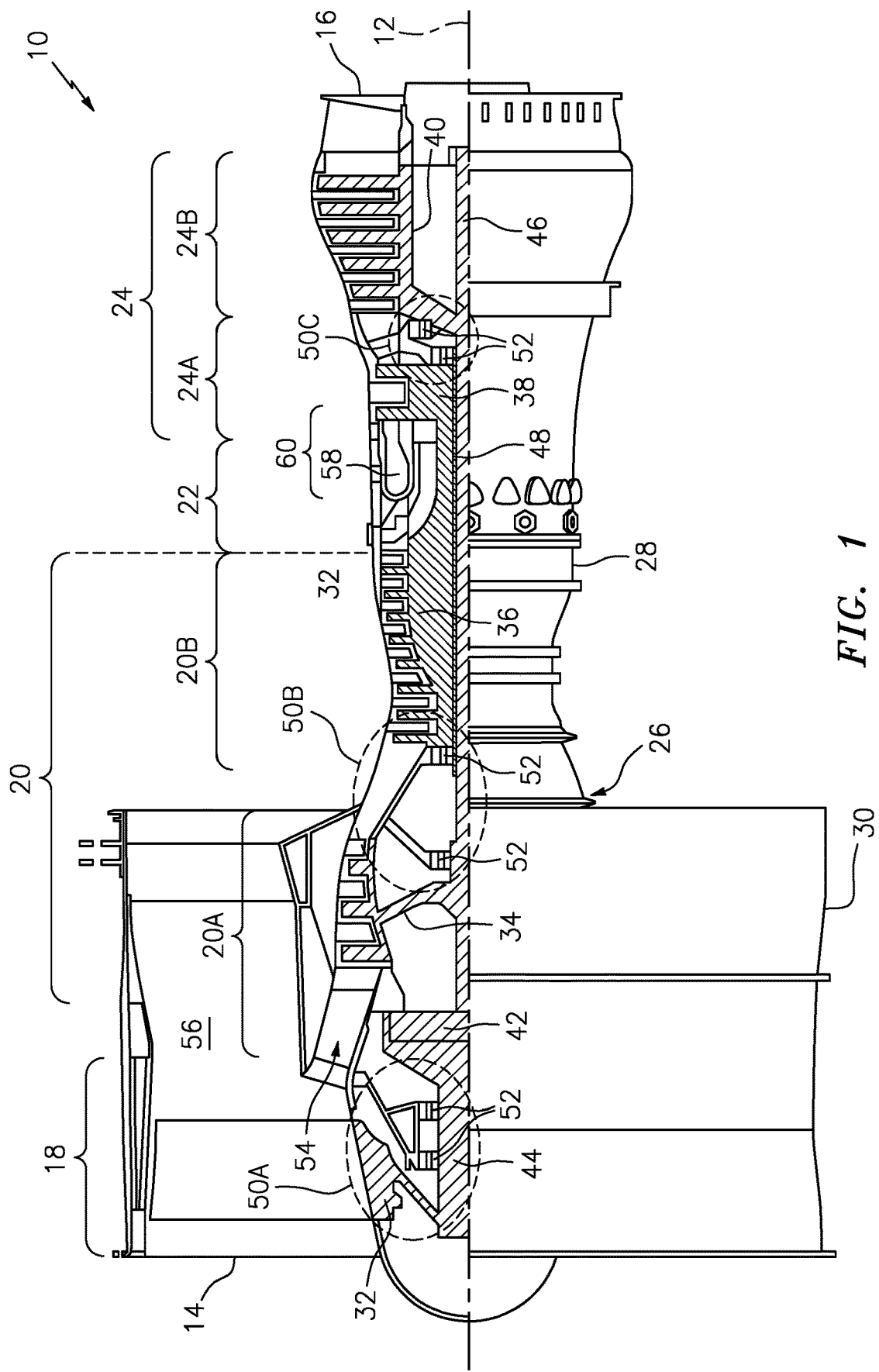
FIG. 1 is a side partial cross-section view of a turbine engine.

FIG. 1 shows a side partial cross-section view of a gas turbine engine 10 and includes axial centerline 12, upstream airflow inlet 14, downstream airflow exhaust outlet 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with core case 28 and fan case 30), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, and combustor 60.

The present disclosure related to an oil drainback system for the bearing compartments 50A, 50B, 50C. After consideration of the following disclosure, it will be appreciated that while this disclosure is made in terms of a gas turbine engine as shown in FIG. 1, the subject matter disclosed herein would be equally useful in other engine or turbine settings wherein bearing compartments have an oil drainback system which reintroduces oil to the bearing compartment at a potentially elevated pressure and/or accompanied by a high velocity gas stream.

Figure 2:
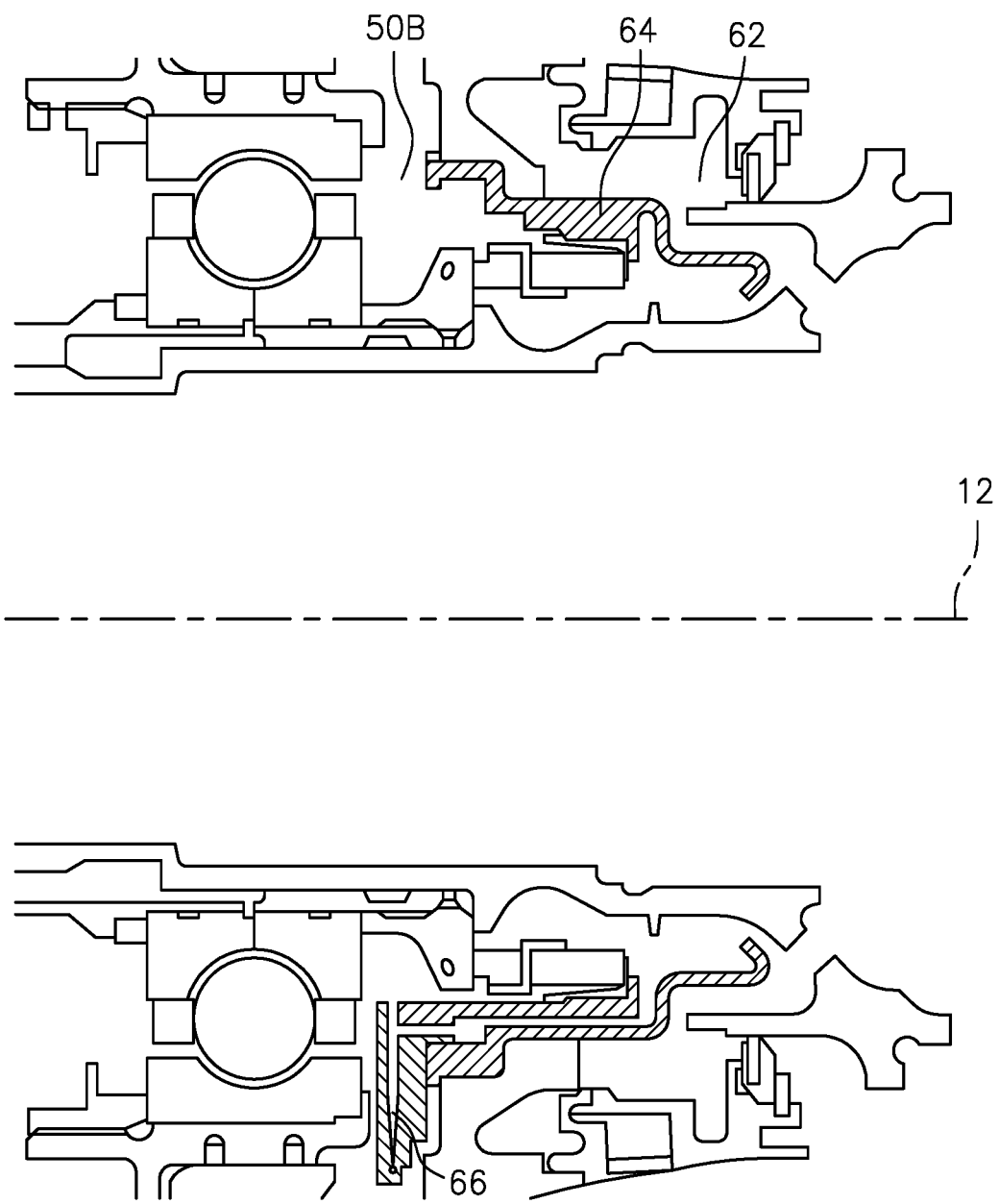
FIG. 2 is a cross-sectional view of a bearing compartment of a gas turbine engine.

FIG. 2 is an enlarged view of components of bearing compartment 50B of FIG. 1, and shows surrounding buffer air cavity 62 separated from bearing compartment 50B by a seal support 64. A drain tube assembly 66 is schematically shown in the lower portion of this drawing and shows the position of oil being re-introduced into the bearing compartment 50B near the sump after being collected from the buffer air cavity 62.

Figure 3:
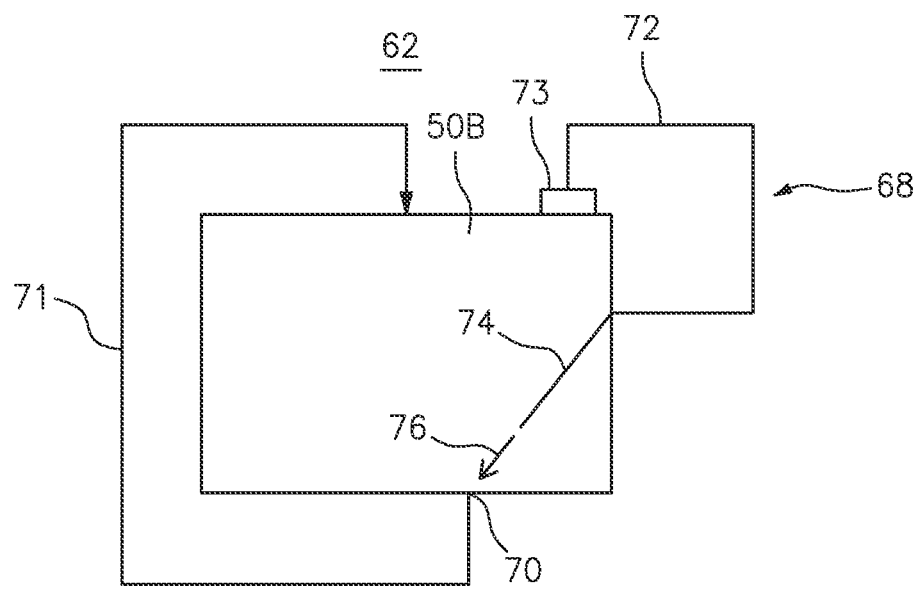
FIG. 3 is a schematic illustration of an oil drainback system.

FIG. 3 is a completely schematic illustration of oil flow through and around the bearing compartment 50B and an accompanying oil drainback system 68. A sump 70 allows oil to flow to a storage tank (not shown) with filters and the like where oil can then be drawn or fed back to the bearing compartment as needed, schematically illustrated by arrow 71. In addition, oil which has reached the buffer air cavity 62 is collected in an oil drainback system 68 and returned to the bearing compartment 50B. This oil can be collected, for example by centripetal force and gravity, in a gutter system schematically illustrated at 73 and then flows at pressure typically influenced by pressure in the buffer air area 62, through an oil flow path 72 to an oil drain tube 74 which typically introduces the collected oil near sump 70. Oil and air in the oil flow path are typically exposed to the higher pressure which can be present in the buffer air cavity 62, and therefore gas (air) and entrained oil can frequently be introduced back into bearing compartment 50B at a high velocity from drain tube 74, which high velocity is schematically illustrated at arrow 76.

Figure 4:
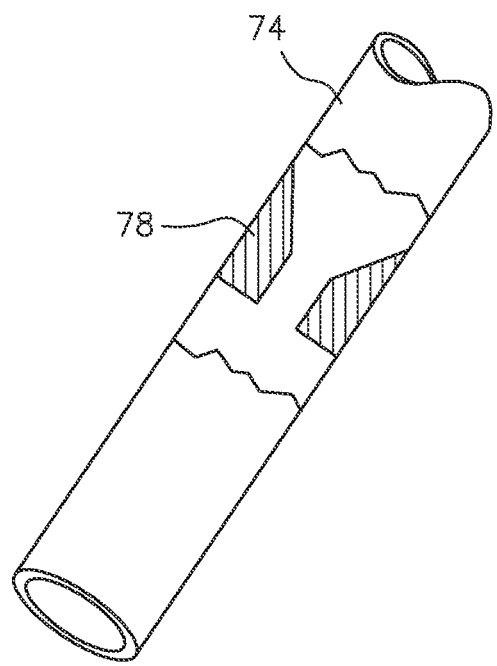
FIG. 4 shows an orifice in a drain tube of a drainback system.

High velocity flow 76 can interfere with proper scavenging and flow of oil through sump 70, resulting in this area of the bearing compartment becoming flooded with oil. In order to prevent this, and as shown in FIG. 4, an orifice 78 or other flow restriction has been placed in drain tube 74 to reduce the impact of air flow into the bearing compartment. To effectively address the problem, orifices as small as 0.044 inches in diameter have been utilized. However, an orifice this small is extremely prone to blockage with debris that can frequently be present in the flow of air and oil from the sump.

An in-line orifice as shown in FIG. 4 restricts air flow and this restricted flow is then able to expand into the tube after the restriction, slowing down before exiting the tube into the compartment.

The diffusers as disclosed herein do not restrict mass flow like the orifice. Rather, they increase the flow area at the exit to allow the mass flow from the drain tube to diffuse as opposed to exiting from the tube and acting like a single jet of air/oil.

Diffusers as disclosed herein are configured to produce in-line flow velocity less than or equal to that which is produced using an orifice in the line. In other words, an orifice as shown in FIG. 4 can be used and optimized until an acceptable in-line flow velocity is achieved, that is, one which does not interfere with proper flow to the sump. Once this acceptable in-line flow velocity is determined, a diffuser such as those disclosed herein can be configured with side openings in various configurations to produce an in-line flow velocity less than or equal to the acceptable in-line velocity, while doing so with diffusion and larger flow openings, thereby reducing the chance of blockage due to debris.

Figure 5:
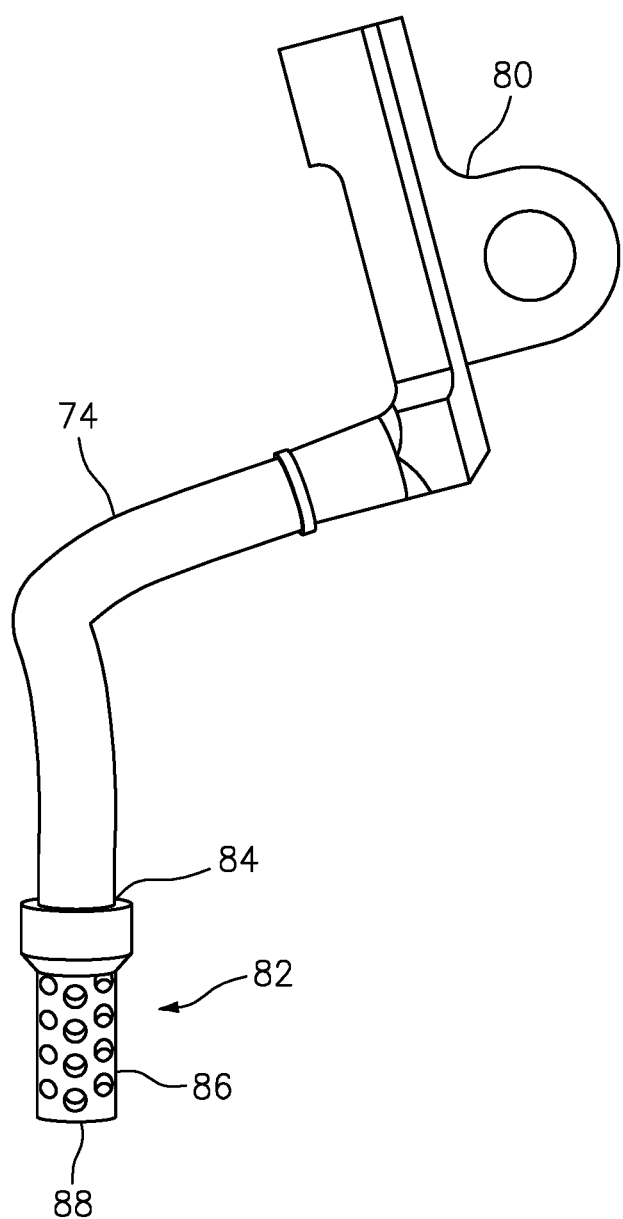
FIG. 5 illustrates a drain tube with a diffuser device according to one non-limiting embodiment.

FIG. 5 shows drain tube 74 mounted to a structure 80 which could be a portion of the structure of bearing compartment 50B such as a strut or the like. As shown, a diffuser device 82 can be affixed to an end 84 of drain tube 74. Diffuser device 82 receives flow at end 84 of drain tube 74 and diffuses and re-directs flow from drain tube 74 to remove negative effects of high pressure, high velocity flow into the bearing compartment 50B. Further, diffuser device 82 is also configured to minimize the possibility of blockage from debris. In addition to the illustration in FIG. 5, FIGS. 6-11 illustrate different non-limiting configurations of a diffuser device and these different configurations are discussed below.

Figure 6:
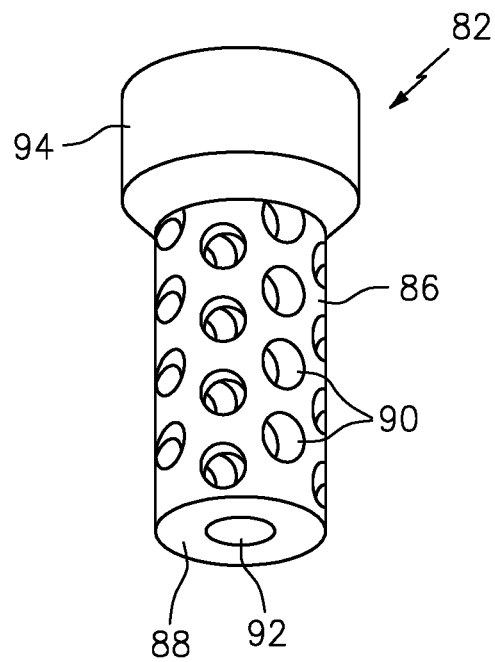
FIGS. 6 and 7 illustrate details of another non-limiting embodiment of a diffuser device.
Figure 7:
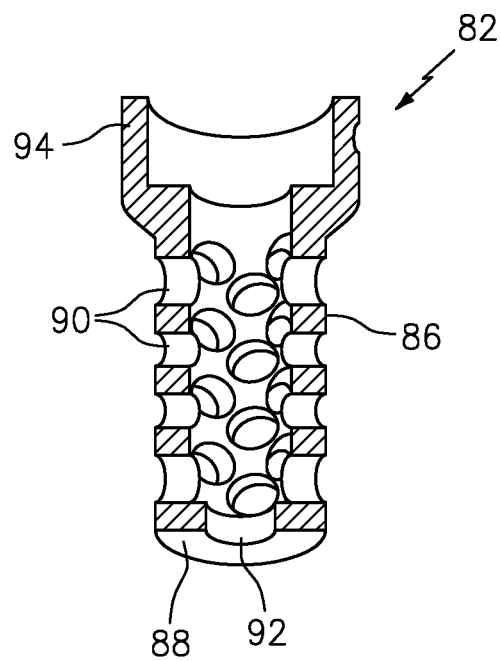

FIGS. 6 and 7 show diffuser device 82 defined by a sidewall 86 having openings 90 passing through sidewall 86. These openings are sized and arranged to direct flow laterally out of diffuser device 82, which both slows the velocity of the flow and also directs it away from the sump in the typical configuration wherein drain tube 74 is pointed at the sump. In this configuration, end wall 88 also has an end opening 92. The size and amount of side openings 90 and end opening 92 are configured to reduce velocity of flow out of drain tube 74 in the axial direction of drain tube 74, while still maintaining the size of all openings large enough to avoid potential blockage by debris.

In the configuration shown, sidewall 86 defines a substantially cylindrical shaped structure, with openings 90 arranged around the circumference of the cylinder and also along the length of the cylinder, and with a substantially flat end wall 88 with one centered end opening 92. It should be appreciated that other positioning and configuration of the openings 90, 92 could be effective as well. In this regard, it has been found particularly useful for a ratio of flow area of openings 90 to end opening 92 to be at least high enough to produce an exit velocity from the diffuser that is equivalent to or less than the exit velocity of an in-line orifice configuration (such as is shown in FIG. 4) that is known to produce acceptable results, while nevertheless reducing or avoiding the risk of plugging of the diffuser from debris.

FIGS. 6 and 7 also show an enlarged portion 94 at one end of diffuser device 82 and this serves to configure diffuser device 82 for attachment to drain tube 74. This can be by way of a press fit, or with a tightening strap (not shown) or any other mechanism including threads, adhesive or the like. Further, in some instances it may be desirable to manufacture the diffuser device integrally with the end of the drain tube instead of as a separate part. Of course, maintaining diffuser device 82 as a separate part may be more practical for maintenance and cleaning as necessary, and also for the purpose of retro-fitting oil drainback systems with either a straight drain tube or a drain tube with an orifice or other flow restriction.

Figure 8:
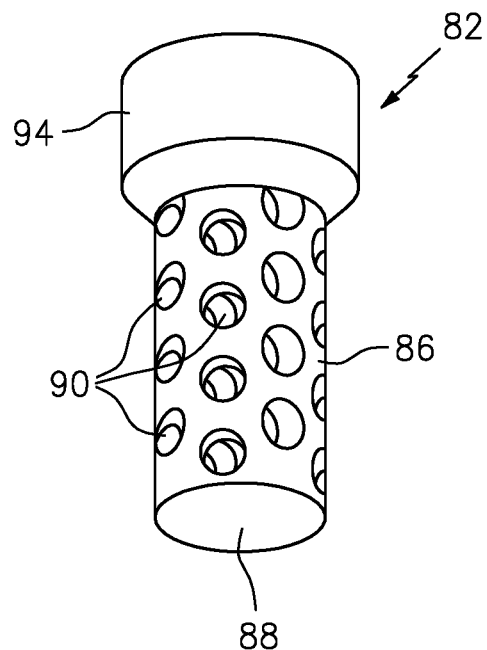
FIGS. 8 and 9 illustrate details of another non-limiting embodiment of a diffuser device.
Figure 9:
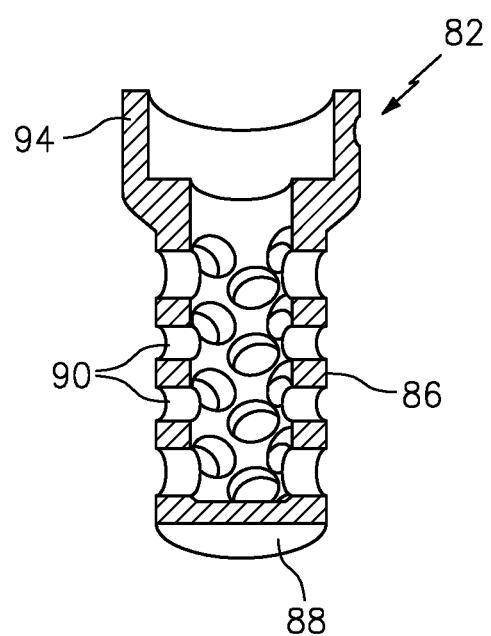

FIGS. 8 and 9 illustrate another non-limiting embodiment wherein diffuser device 82 has openings 90 in sidewall 86, but no end opening. Thus, in this configuration, end wall 88 is a solid wall. This advantageously completely removes an air vector directly in line with the drain tube 74, such that all flow is directed laterally. This configuration can advantageously have openings 90 defining a flow area of the plurality of holes 90 such that the exit velocity of the air due to the diffusion from going from the drain tube ID of a smaller flow area to this larger flow area created by all the holes is equivalent to or less than the exit velocity of an in-line orifice configuration (FIG. 4) that is known to produce acceptable results.

Figure 10:
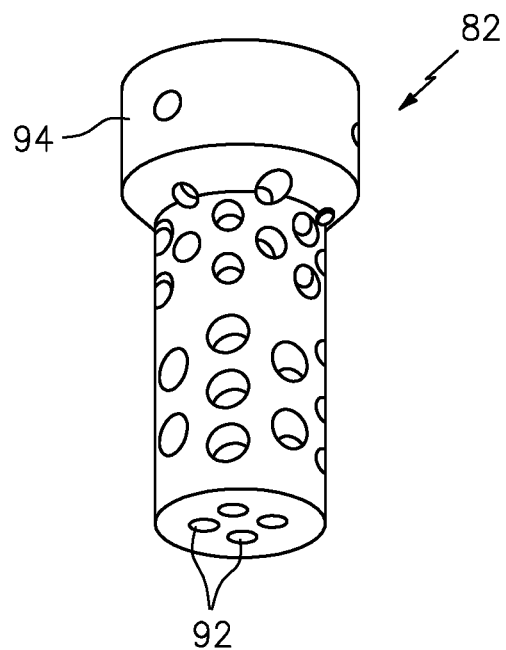
FIGS. 10 and 11 illustrate details of another non-limiting embodiment of a diffuser device.
Figure 11:
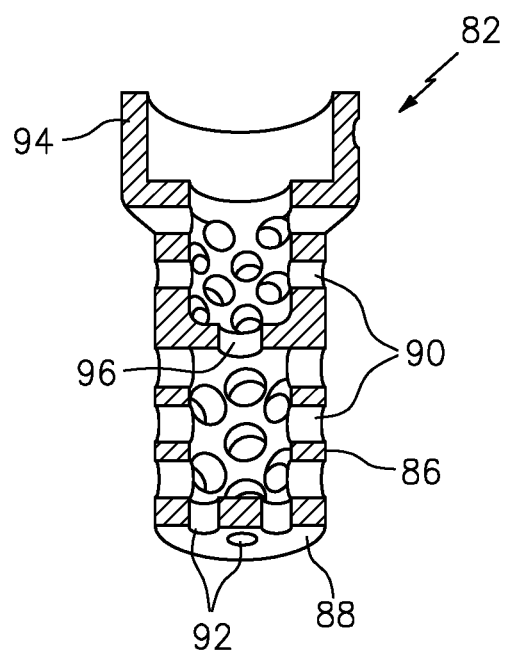

FIGS. 10 and 11 illustrate another non-limiting configuration of a diffuser device 82 wherein openings 90 are positioned in sidewall 86 as mentioned above. In this configuration, a plurality of end openings 92 are positioned in end wall 88. Further, a baffle, or central flow opening 96 is positioned within diffuser device 82 as shown. Further, in this configuration, openings 90 in sidewall 86 can be larger upstream of the baffle, and smaller downstream of the baffle. Also in this configuration, it should be appreciated that the plurality of end openings 92 are all off direct-center, such that even the end openings produce at least some re-direction of flow along the axis of drain tube 74 and diffuser device 82. In this configuration, it may be desired to provide openings upstream and downstream of baffle 96 having different sizes, for example with smaller size openings upstream of the baffle and larger size openings downstream of the baffle. The configuration of these different size openings, as with other features of the diffuser, can be based on achieving equivalent air exit velocity compared to a conventional orifice design which produces acceptable results with respect to flow at the sump.

In the configuration of FIGS. 10-11, as with the previously discussed configurations, the sizing and placement of the different holes in the diffuser can be configured to produce a flow velocity of similar or less impact than what can be accomplished with an in-line orifice, while greatly reducing susceptibility to plugging due to debris.

In operation, the oil drainback system such as that illustrated in FIG. 3 collects oil from the buffered air cavity and returns this oil back to the bearing compartment to prevent migration of the oil to areas of the engine where oil is not desired. This is accomplished with a gutter system 73 which collects such oil typically assisted by centripetal force and gravity. This collected oil then flows through gas flow path 72 to drain tube 74. When pressure in the buffer air cavity results in elevated pressure differential as compared to the sealed bearing compartment, the diffuser device as disclosed herein prevents a high velocity stream of air directly from exiting drain tube 74 at a high velocity directed at the sump, and therefore helps to avoid flooding of the sump and excessive air ingestion. Further, the diffuser device is configured to reduce the chance of blockage with debris, thereby providing an oil drainback system which addresses the issues identified above.

It should also be appreciated that the present disclosure lends itself to retro-fitting of existing systems which have either a non-restricted drain tube, or a drain tube with an orifice or other flow restriction. In such a situation, any orifice or flow restriction can be removed from the drain tube and replaced with a diffuser device as disclosed herein, thereby improving functionality of the drainback system without increasing issues of blockage from debris.

Although a combination of features is shown in the illustrated examples, not all of these features need to be combined to realize the benefits of various embodiments of this disclosure. In other words, a method according to an embodiment of this disclosure will not necessarily include all of the features shown in any one of the figures or all of the steps or details schematically shown in the figures. Moreover, selected features of one example embodiment may be combined with selected features of other embodiments.

It should be understood that like reference numerals identify corresponding or similar elements throughout the several drawings.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A diffuser for an oil drainback system drain tube, comprising:
    a flow chamber configured for attachment to an open end of a drain tube, wherein the flow chamber has a side wall and an end wall, and openings in at least the side wall, wherein the flow chamber further comprises at least one end opening in the end wall, further comprising at least one baffle in the flow chamber between an inlet end where the flow chamber connects to the drain tube, and the at least one end opening, wherein the openings in the side wall are distributed upstream and downstream of the baffle, and wherein openings upstream of the baffle have a smaller diameter than openings downstream of the baffle.

2. The diffuser of claim 1, wherein the side wall defines a cylinder, and wherein the openings are distributed around a circumference of the cylinder.

3. The diffuser of claim 2, wherein the openings are also distributed along a length of the cylinder.

4. A diffuser for an oil drainback system drain tube, comprising:
    a flow chamber configured for attachment to an open end of a drain tube, wherein the flow chamber has a side wall and an end wall, and openings in at least the side wall, wherein the flow chamber further comprises at least one end opening in the end wall, and wherein a collective flow area of the openings in the side wall is greater than a collective flow area of the at least one end opening.

5. An oil drainback system for a bearing compartment of a gas turbine engine, comprising:
    a bearing compartment;
    a buffer air area around the bearing compartment;
    a sump for scavenging oil from the bearing compartment;
    a gutter system for collecting oil from the buffer air area;
    an oil flow path connected to the gutter system and exposed to pressure within the buffer air area;
    a drain tube connected to the oil flow path and extending into the bearing compartment to return oil collected from the buffer air area to the bearing compartment; and
    means for diffusing gas flow from the drain tube within the bearing compartment.

6. The oil drainback system of claim 5, wherein the means for diffusing comprises a flow chamber attached to an open end of the drain tube, wherein the flow chamber has a side wall and an end wall, and openings in at least the side wall.

7. The system of claim 6, wherein the flow chamber further comprises at least one end opening in the end wall.

8. The system of claim 7, wherein a collective flow area of the openings in the side wall is greater than e a collective flow area of the at least one end opening.

9. The system of claim 7, further comprising at least one baffle in the flow chamber between an inlet end where the flow chamber connects to the drain tube, and the at least one end opening.

10. The system of claim 9, wherein the openings in the side wall are distributed upstream and downstream of the baffle.

11. The system of claim 10, wherein openings upstream of the baffle have a smaller diameter than openings downstream of the baffle.

12. The system of claim 5, wherein the side wall defines a cylinder, and wherein the openings are distributed around a circumference of the cylinder.

13. The system of claim 12, wherein the openings are also distributed along a length of the cylinder.

14. A method for upgrading an oil drainback system for a gas turbine engine, wherein the oil drainback system comprises a bearing compartment; a buffer air area around the bearing compartment; a sump for scavenging oil from the bearing compartment; a gutter system for collecting oil from the buffer air area; an oil flow path connected to the gutter system and exposed to pressure within the buffer air area; and a drain tube connected to the oil flow path and extending into the bearing compartment to return collected oil from the buffer air area to the bearing compartment, wherein the method comprises mounting a diffuser to an open end of the drain tube, wherein the diffuser comprises a flow chamber configured for attachment to the open end of the drain tube, the flow chamber having a side wall and an end wall, and openings in at least the side wall.

15. The method of claim 14, wherein the drain tube contains an orifice for restricting flow through the drain tube, and wherein the method further comprises removing the orifice from the drain tube in advance of the mounting step.

* * * * *